May 16, 1961 H. H. EMMERICH 2,984,280
TIRE CHAINS
Filed Sept. 29, 1960
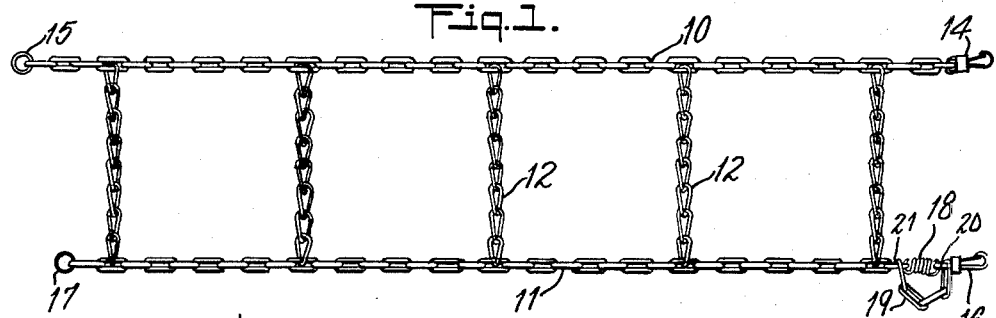
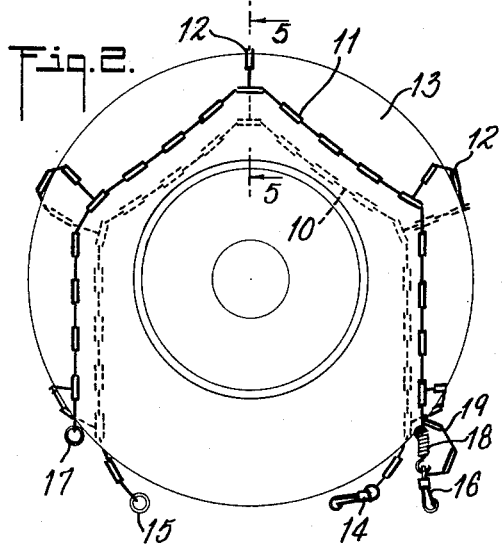
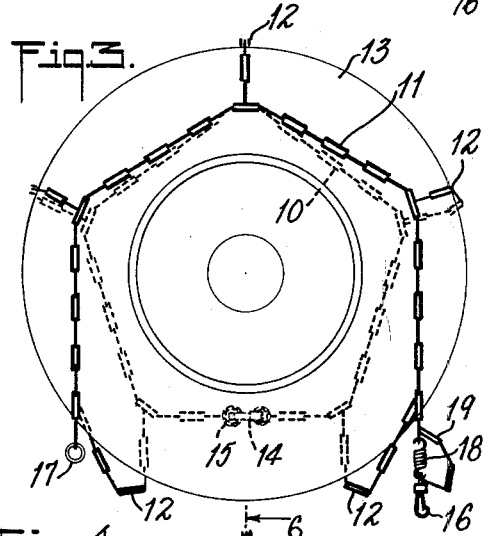
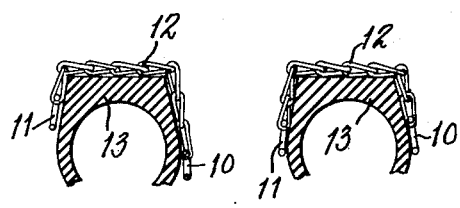
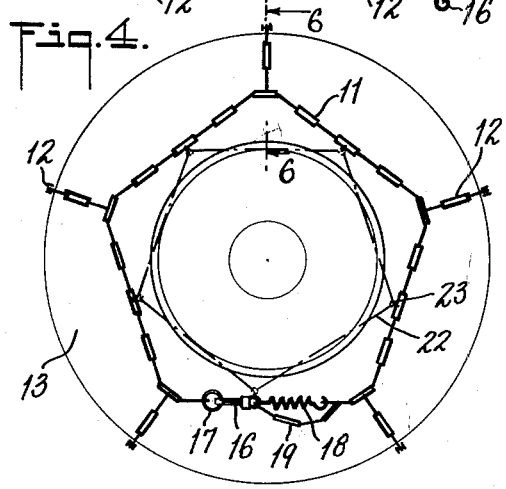
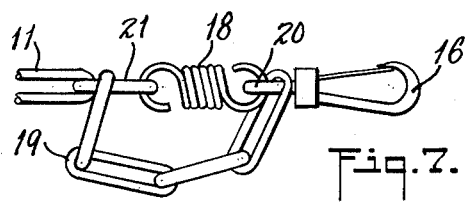
INVENTOR.
HARRY H. EMMERICH
BY
ATTORNEY US Patent Office 2,984,280
Patented May 16, 1961

2,984,280
TIRE CHAINS
Harry H. Emmerich, West Cross Road, New Canaan, Conn.

Filed Sept. 29, 1960, Ser. No. 59,389

1 Claim. (Cl. 152—241)

The invention herein disclosed relates to nonskid tire chains and the general objects of the invention are to provide a reliable and efficient tire chain of simple low cost construction which can be quickly and easily applied to or be removed from a tire and particularly a construction which can be put on or taken off the tire without raising or moving the tire.

Further special objects of the invention are to provide tire chains so constructed that they may be "stretched" to some extent to facilitate their application and connection on the tire and which will be protected against weakening or breaking of the spring constituting or providing the stretch mechanism.

Other desirable objects and the novel features of construction, combination and relation of parts are set forth and will appear in the course of the following specification.

The drawing accompanying and forming part of this specification is illustrative of a preferred embodiment of the invention. Structure however may be modified and changed as regards the immediate illustration, all within the true intent and scope of the invention as hereinafter defined and claimed.

Fig. 1 in the drawing is a plan view of the nonskid chain structure in extended form.

Figs. 2, 3 and 4 are front elevations illustrating successive stages in applying and securing the chains on a tire.

Figs. 5 and 6 are cross sectional views with parts appearing as on line 5—5 of Fig. 2 and 6—6 of Fig. 4.

Fig. 7 is an enlarged broken detail of the extension spring and safety chain incorporated in one of the side chains.

The invention comprises, as shown in Fig. 1, inner and outer side chains 10 and 11 of a length, in circular formation, to lie at the opposite sides of a tire to which they are applied, connected in this spaced apart relation by equally spaced nonskid cross chains 12 of a length to arch across the crown of the tire and thus to properly support the circular chains at the sides of the tire.

The equally spaced cross chains or traction chains 12 are of a number such that when draped over a tire the adjoining two at the ends of the chains will be at opposite sides of the bottom center of the tire and at a distance apart such that the ends of the side chains can be connected without moving the tire.

It has been found that five equally spaced cross chains, as illustrated, will accomplish this result.

Fig. 2 shows how, with this arrangement, the chains may be applied by first draping them over the tire, indicated at 13, with the center cross chain 12 at the top of the tire and the inner side chain 10 suspended therefrom at the inner side of the tire, partly supported by cross chains 12 at opposite sides of the center. This leaves the lower cross chains at the ends of the two side chains spaced apart a distance which can be bridged by the ends of the inner chain 10, substantially as indicated in Fig. 3, without having to pull the end cross chains under the tire.

The means for connecting the ends of the side chains together may vary but some easily engageable and releasable means is preferred such as the companion snap hooks and rings indicated at 14 and 15.

Fig. 3 shows how, after draping the chains loosely over the tire, the ends of the inner chain can be brought together and connected by engagement of snap hook 14 with ring 15 on the ends of this chain. The outer side chain hanging free at this time, as shown in this view, permits connection of the inner chain without any difficulty.

After connection of the inner side chain as in Fig. 3 the ends of the outer side chain 11 may be brought together and connected by the snap hook 16 and ring 17 on the ends of that chain, substantially as shown in Fig. 4.

To take up slack and hold the chains firmly in place on the tire a tension spring 18 is interposed at one end of the outer side chain.

This gives the outer chain a certain amount of "stretch" which is helpful in mounting the chains and which tensions the chains firmly on the tire.

To guard against breakage or weakening of this interposed spring a safety chain is bridged about the spring, shown as made up of chain links 19 connected about the opposite ends of the spring, in this case with the links 20, 21, Fig. 7, with which the ends of the spring are connected.

The outer side chain 11 may be proportioned so that the overall length of the same will be the same as the inner side chain when the spring is under tension.

Thus in the illustration, Fig. 1, the ring end of the outer chain may be shorter than the opposite, hook end, a distance approximately equivalent to the length of the extended spring so that the spring will be under tension when applied to the tire and the safety links 19 bridging the spring will be ready to take the load at any time if the spring should break or weaken.

After applying the chains, as shown in Fig. 4, an elastic ring 22 may be connected by hooks 23 with intermediate portions of the outer chain at points between the cross chains to keep the structure taut and prevent slap of the cross chains or other objectionable noise.

To facilitate connection of the inner side chain the chains may be rotated either to the left or to the right from the Fig. 2 position to bring the gap within easy reach, after which, when the ends of the inner chain are connected, the chains can be rotated back to the original position shown in Fig. 2, whereon the outer side chain can be easily connected.

What is claimed is:

Tire chains comprising the combination of side chains connected in parallel relation by equally spaced cross chains, said side chains being of a length in circular formation to lie at the opposite sides of a tire and said cross chains being of a length to bridge the crown and support the side chains at the opposite sides of the tire, quickly engageable and disengageable connections at the ends of said side chains, a tension spring interposed in one of said side chains and a safety chain interposed in said side chain and bridged about the ends of said interposed spring, the side chain having the interposed spring being shorter than the other side chain a distance approximately equal to the length of the spring extended to the distance permitted by said safety chain.

References Cited in the file of this patent

UNITED STATES PATENTS

| | | |
|---|---|---|
| 1,393,810 | Moss | Oct. 18, 1921 |
| 1,906,034 | Woolley | Apr. 25, 1933 |
| 2,722,961 | Eden | Nov. 8, 1955 |